(12) United States Patent
Kitamoto (10) Patent No.: US 10,333,382 B2
(45) Date of Patent: Jun. 25, 2019

(54) ELECTRIC POWER CONVERTER

(71) Applicant: JTEKT CORPORATION, Osaka-shi, Osaka (JP)

(72) Inventor: Hiroshi Kitamoto, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/183,830

(22) Filed: Nov. 8, 2018

(65) Prior Publication Data
US 2019/0149031 A1     May 16, 2019

(30) Foreign Application Priority Data

Nov. 14, 2017     (JP) ................................ 2017-219357

(51) Int. Cl.
*H02M 1/08*       (2006.01)
*H02J 3/38*       (2006.01)
(Continued)

(52) U.S. Cl.
CPC ................. *H02M 1/08* (2013.01); *H02J 3/38* (2013.01); *H02M 7/53871* (2013.01); *H02M 2001/007* (2013.01)

(58) Field of Classification Search
CPC ........ H02M 1/08; H02M 1/081; H02M 1/082; H02M 1/084; H02M 1/088; H02M 1/12;
(Continued)

(56) References Cited

U.S. PATENT DOCUMENTS

| | | | | |
|---|---|---|---|---|
| 2010/0315025 A1* | 12/2010 | Yundt | ..................... | H02P 21/36 318/375 |
| 2012/0146567 A1* | 6/2012 | Iwaji | ....................... | H02P 29/02 318/504 |

(Continued)

FOREIGN PATENT DOCUMENTS

| | | |
|---|---|---|
| JP | 2014-045576 A | 3/2014 |
| WO | 2017/017434 A1 | 2/2017 |

OTHER PUBLICATIONS

Feb. 26, 2019 Extended Search Report issued in European Patent Application No. 18205880.0.
(Continued)

*Primary Examiner* — Adolf D Berhane
(74) *Attorney, Agent, or Firm* — Oliff PLC (57) ABSTRACT

In an electric power converter, a driver unit includes an output unit, an auxiliary power source, a switch circuit unit, and a diode. The output unit includes first and second MISFETs and selectively outputs an on signal or an off signal to a gate electrode of a first HEMT. The auxiliary power source outputs a predetermined positive voltage. The switch circuit unit selectively connects a source electrode of the first MISFET to the auxiliary power source or a drain electrode of the first HEMT. The diode is connected to a source electrode of the second MISFET and is oriented such that forward current flows to a source electrode of the first HEMT. In the event of a short circuit in a certain HEMT, a microcomputer connects the source electrode of the first MISFET to the auxiliary power source and outputs an off command to the driver unit.

4 Claims, 5 Drawing Sheets

(51) Int. Cl.
*H02M 7/5387* (2007.01)
*H02M 1/00* (2006.01)

(58) Field of Classification Search
CPC ....... H02M 2001/007; H02M 7/53871; H02M 7/53873; H02J 3/38
See application file for complete search history.

(56) References Cited

U.S. PATENT DOCUMENTS

| | | | |
|---|---|---|---|
| 2013/0181639 A1* | 7/2013 | Yamanaka | H02P 3/14 318/139 |
| 2014/0055059 A1 | 2/2014 | Uryu et al. | |
| 2017/0264221 A1 | 9/2017 | Cash | |
| 2017/0279376 A1* | 9/2017 | Siri | H02M 7/53871 |
| 2017/0365997 A1* | 12/2017 | Kitamoto | H02H 3/006 |

OTHER PUBLICATIONS

Gurpinar, Emre et al., "600 V Normally-Off P-Gate GAN HEMT Based 3-Level Inverter", 2017 IEEE 3rd International Future Energy Electronics Conference and ECCE Asia (IFEEC 2017—ECCE Asia), pp. 621-626, 2017.

\* cited by examiner

ELECTRIC POWER CONVERTER

INCORPORATION BY REFERENCE

The disclosure of Japanese Patent Application No. 2017-219357 filed Nov. 14, 2017 including the specification, drawings and abstract, is incorporated herein by reference in its entirety.

BACKGROUND OF THE INVENTION

1. Field of the Invention

The invention relates to an electric power converter.

2. Description of Related Art

Japanese Patent Application Publication No. 2014-045576 (JP 2014-045576 A) discloses an electric power steering system. The electric power steering system includes a motor driver as an example of an electric power converter. The motor driver includes a motor, an inverter unit, and a motor relay. The inverter unit converts direct-current (DC) power, from a DC power source, to alternating current (AC) to sinusoidally drive the motor. The inverter unit includes a U-phase arm circuit, a V-phase arm circuit, and a W-phase arm circuit respectively corresponding to a U-phase winding, a V-phase winding, and a W-phase winding of the motor.

Each of the U-phase arm circuit, the V-phase arm circuit, and the W-phase arm circuit includes a high-side metal oxide semiconductor field effect transistor (MOSFET) and a low-side MOSFET. The motor relay is interposed between the motor and the inverter unit to interrupt electrical connection between the motor and the inverter unit in the event a problem occurs with the motor or the inverter unit. The motor relay includes a U-phase motor relay, a V-phase motor relay, and a W-phase motor relay respectively corresponding to the U-phase winding, the V-phase winding, and the W-phase winding of the motor.

The U-phase motor relay is interposed between the U-phase arm circuit and the U-phase winding of the motor. The V-phase motor relay is interposed between the V-phase arm circuit and the V-phase winding of the motor. The W-phase motor relay is interposed between the W-phase arm circuit and the W-phase winding of the motor.

In the electric power converter disclosed in JP 2014-045576 A, the motor relays are used to interrupt electrical connection between the motor and the inverter unit. This requires as many motor relays as the number of phases of the motor. Thus, this increases the number of components and accordingly increases the cost and size of the electric power converter.

SUMMARY OF THE INVENTION

A purpose of the invention is to provide an electric power converter that allows cost and size reduction.

An electric power converter including the following: an inverter unit configured to convert direct current power, from a direct current source, to alternating current to drive a motor and including multiple high electron mobility transistors (HEMTs) that form multiple arm circuits; multiple driver units, each connected to and configured to turn on and off a corresponding one of the HEMTs; a short circuit detector configured to detect a short circuit in the HEMTs; and a controller connected to the driver units and the short circuit detector, and configured to control the driver units.

Each of the driver units includes an output unit, an auxiliary power source, a switch unit, and a diode. The output unit includes a series circuit of first and second switching elements with drain electrodes connected together. The output unit responds to on and off commands from the controller by respectively outputting on and off signals to a gate electrode of the corresponding HEMT from a connection node between the first and second switching elements to turn on and off the corresponding HEMT. The auxiliary power source outputs a predetermined positive voltage. The switch unit switches between a first connection state and a second connection state. In the first connection state, the switch unit connects a source electrode of the first switching element to the auxiliary power source. In the second connection state, the switch unit connects the source electrode of the first switching element to a drain electrode of the corresponding HEMT. The diode is interposed between a source electrode of the second switching element and a source electrode of the corresponding HEMT, and is oriented such that forward current through the diode flows from the source electrode of the second switching element to the source electrode of the corresponding HEMT. The controller switches the switch unit from the first connection state to the second connection state and outputs the off command to each of the driver units when determining, on the basis of an output of the short circuit detector, that the short circuit occurs in any of the HEMTs.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
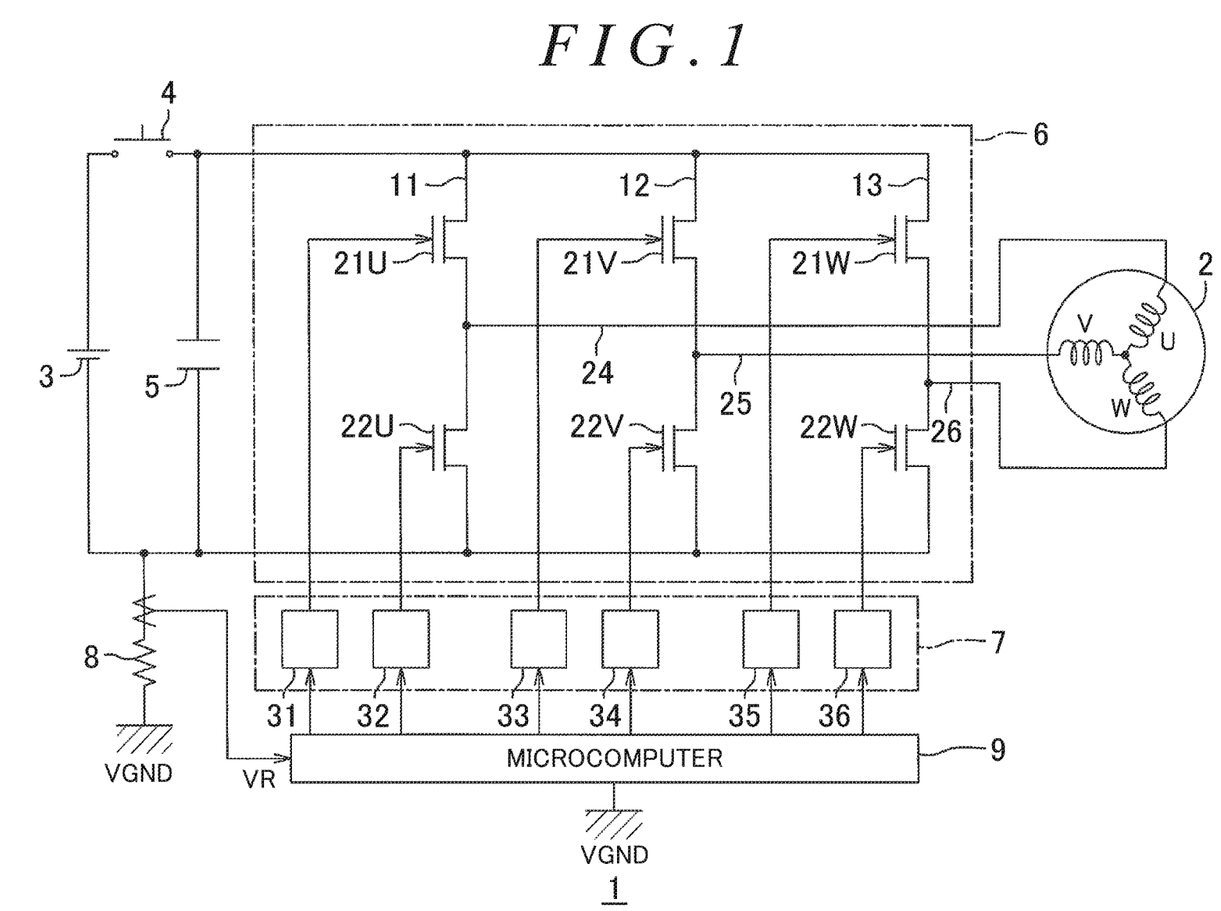
FIG. 1 is a circuit diagram illustrating an electric power converter according to an embodiment of the invention.

Embodiments of the invention are described in detail below with reference to the drawings. FIG. 1 is a circuit diagram illustrating an electric power converter 1 according to an embodiment of the invention. According to the embodiment, the electric power converter 1 is a three-phase inverter circuit and supplies electric power to a three-phase motor 2. Referring to FIG. 1, the electric power converter 1 includes a direct-current (DC) power source 3, a power supply switch 4, a smoothing capacitor 5, an inverter circuit unit 6 (an inverter unit), a driver circuit unit 7 (a driver unit), a shunt resistor 8 (a short circuit detector), and a microcomputer 9 (a controller).

The smoothing capacitor 5 is connected in series with the DC power source 3 via the power supply switch 4. The inverter circuit unit 6 is connected in parallel with the smoothing capacitor 5. The inverter circuit unit 6 includes a U-phase arm circuit 11, a V-phase arm circuit 12, and a W-phase arm circuit 13. The U-phase arm circuit 11, the V-phase arm circuit 12, and the W-phase arm circuit 13 respectively correspond to a U-phase winding, a V-phase winding, and a W-phase winding of the three-phase motor 2. The U-phase arm circuit 11, the V-phase arm circuit 12, and the W-phase arm circuit 13 are connected in parallel with the smoothing capacitor 5.

The U-phase arm circuit 11 includes a series circuit of a high-side first high electron mobility transistor (HEMT) 21U and a low-side second HEMT 22U. The first HEMT 21U forms an upper arm. The second HEMT 22U forms a lower arm. The first HEMT 21U and the second HEMT 22U are normally-off devices.

The V-phase arm circuit 12 includes a series circuit of a high-side first HEMT 21V and a low-side second HEMT 22V. The first HEMT 21V forms an upper arm. The second HEMT 22V forms a lower arm. The first HEMT 21V and the second HEMT 22V are normally-off devices.

The W-phase arm circuit 13 includes a series circuit of a high-side first HEMT 21W and a low-side second HEMT 22W. The first HEMT 21W forms an upper arm. The second HEMT 22W forms a lower arm. The first HEMT 21W and the second HEMT 22W are normally-off devices.

Each of the first HEMTs 21U, 21V, and 21W has a first gate electrode, a first source electrode, and a first drain electrode. Each of the second HEMTs 22U, 22V, and 22W has a second gate electrode, a second source electrode, and a second drain electrode. The U-phase arm circuit 11 is formed by connecting the first source electrode of the first HEMT 21U to the second drain electrode of the second HEMT 22U. The V-phase arm circuit 12 is formed by connecting the first source electrode of the first HEMT 21V to the second drain electrode of the second HEMT 22V. The W-phase arm circuit 13 is formed by connecting the first source electrode of the first HEMT 21W to the second drain electrode of the second HEMT 22W.

Each of the first HEMTs 21U, 21V, and 21W has a first threshold voltage Vth1. The first HEMTs 21U, 21V, and 21W switch from an off state to an on state when both the following conditions are satisfied: a first drain voltage VD1 is greater than or equal to a first source voltage VS1 (i.e., VD1≥VS1); and a first gate-source voltage VGS1 between the first gate electrode and the first source electrode is greater than the first threshold voltage Vth1 (i.e., VGS1>Vth1).

Then, the first HEMTs 21U, 21V, and 21W switch from the on state back to the off state when the first gate-source voltage VGS1 becomes less than or equal to the first threshold voltage Vth1 (i.e., VGS1≤Vth1). Further, the first HEMTs 21U, 21V, and 21W switch from the off state to the on state when both the following conditions are satisfied: the first drain voltage VD1 is less than the first source voltage VS1 (i.e., VD1<VS1); and a first gate-drain voltage VGD1 between the first gate electrode and the first drain electrode is greater than the first threshold voltage Vth1 (i.e., VGD1>Vth1).

Then, the first HEMTs 21U, 21V, and 21W switch from the on state back to the off state when the first gate-drain voltage VGD1 becomes less than or equal to the first threshold voltage Vth1 (i.e., VGD1≤Vth1). Each of the second HEMTs 22U, 22V, and 22W has a second threshold voltage Vth2. The second HEMTs 22U, 22V, and 22W switch from an off state to an on state when both the following conditions are satisfied: a second drain voltage VD2 is greater than or equal to a second source voltage VS2 (i.e., VD2≥VS2); and a second gate-source voltage VGS2 between the second gate electrode and the second source electrode is greater than the second threshold voltage Vth2 (i.e., VGS2>Vth2).

Then, the second HEMTs 22U, 22V, and 22W switch from the on state back to the off state when the second gate-source voltage VGS2 becomes less than or equal to the second threshold voltage Vth2 (i.e., VGS2≤Vth2). Further, the second HEMTs 22U, 22V, and 22W switch from the off state to the on state when both the following conditions are satisfied: the second drain voltage VD2 is less than the second source voltage VS2 (i.e., VD2<VS2); and a second gate-drain voltage VGD2 between the second gate electrode and the second drain electrode is greater than the second threshold voltage Vth2 (i.e., VGD2>Vth2).

Then, the second HEMTs 22U, 22V, and 22W switch from the on state back to the off state when the second gate-drain voltage VGD2 becomes less than or equal to the second threshold voltage Vth2 (i.e., VGD2≤Vth2). The first HEMTs 21U, 21V, and 21W have two-dimensional electron gas (2DEG) channels and therefore have no freewheeling diodes. The first HEMTs 21U, 21V, and 21W are not connected to any freewheeling diodes.

Likewise, the second HEMTs 22U, 22V, and 22W have 2DEG channels and therefore have no freewheeling diodes. The second HEMTs 22U, 22V, and 22W are not connected to any freewheeling diodes. A U-phase wire 24 is connected to a U-phase connection node between the first HEMT 21U and the second HEMT 22U of the U-phase arm circuit 11. The U-phase wire 24 is also connected to the U-phase winding of the three-phase motor 2.

A V-phase wire 25 is connected to a V-phase connection node between the first HEMT 21V and the second HEMT 22V of the V-phase arm circuit 12. The V-phase wire 25 is also connected to the V-phase winding of the three-phase motor 2. A W-phase wire 26 is connected to a W-phase connection node between the first HEMT 21W and the second HEMT 22W of the W-phase arm circuit 13. The W-phase wire 26 is connected to the W-phase winding of the three-phase motor 2.

The driver circuit unit 7 includes a U-phase upper driver circuit unit 31, a U-phase lower driver circuit unit 32, a V-phase upper driver circuit unit 33, a V-phase lower driver circuit unit 34, a W-phase upper driver circuit unit 35, and a W-phase lower driver circuit unit 36. The U-phase upper driver circuit unit 31 is connected to the first HEMT 21U of the U-phase arm circuit 11. The U-phase upper driver circuit unit 31 generates an on-off signal to alternately turn on and off the first HEMT 21U and outputs the on-off signal to the first gate electrode of the first HEMT 21U.

The U-phase lower driver circuit unit 32 is connected to the second HEMT 22U of the U-phase arm circuit 11. The U-phase lower driver circuit unit 32 generates an on-off signal to alternately turn on and off the second HEMT 22U and outputs the on-off signal to the second gate electrode of the second HEMT 22U. The V-phase upper driver circuit unit 33 is connected to the first HEMT 21V of the V-phase arm circuit 12. The V-phase upper driver circuit unit 33 generates an on-off signal to alternately turn on and off the first HEMT 21V and outputs the on-off signal to the first gate electrode of the first HEMT 21V.

The V-phase lower driver circuit unit 34 is connected to the second HEMT 22V of the V-phase arm circuit 12. The V-phase lower driver circuit unit 34 generates an on-off signal to alternately turn on and off the second HEMT 22V and outputs the on-off signal to the second gate electrode of the second HEMT 22V. The W-phase upper driver circuit unit 35 is connected to the first HEMT 21W of the W-phase arm circuit 13. The W-phase upper driver circuit unit 35 generates an on-off signal to alternately turn on and off the first HEMT 21W and outputs the on-off signal to the first gate electrode of the first HEMT 21W.

The W-phase lower driver circuit unit 36 is connected to the second HEMT 22W of the W-phase arm circuit 13. The W-phase lower driver circuit unit 36 generates an on-off signal to alternately turn on and off the second HEMT 22W and outputs the on-off signal to the second gate electrode of the second HEMT 22W. The shunt resistor 8 is interposed between the inverter circuit unit 6 and ground. When electric current flows from the inverter circuit unit 6 to the ground through the shunt resistor 8, a terminal voltage VR appears across terminals of the shunt resistor 8.

The microcomputer 9 is connected to the driver circuit unit 7 and the shunt resistor 8. The microcomputer 9 generates on-off commands to individually turn on and off the first HEMTs 21U, 21V, and 21W and outputs each of the on-off commands to a corresponding one of the U-phase upper driver circuit unit 31, the V-phase upper driver circuit unit 33, and the W-phase upper driver circuit unit 35. The microcomputer 9 generates on-off commands to individually turn on and off the second HEMTs 22U, 22V, and 22W and outputs each of the on-off commands to a corresponding one of the U-phase lower driver circuit unit 32, the V-phase lower driver circuit unit 34, and the W-phase lower driver circuit unit 36. Further, the microcomputer 9 determines, on the basis of the terminal voltage VR of the shunt resistor 8, whether a short circuit occurs in the inverter circuit unit 6.

The U-phase upper driver circuit unit 31, the V-phase upper driver circuit unit 33, and the W-phase upper driver circuit unit 35 generate on-off signals in accordance with the respective on-off commands from the microcomputer 9, and respectively output the on-off signals to the first HEMTs 21U, 21V, and 21W. Thus, the first HEMTs 21U, 21V, and 21W are turned on and off in a predetermined switching pattern. The U-phase lower driver circuit unit 32, the V-phase lower driver circuit unit 34, and the W-phase lower driver circuit unit 36 generate on-off signals in accordance with the respective on-off commands from the microcomputer 9, and respectively output the on-off signals to the second HEMTs 22U, 22V, and 22W. Thus, the second HEMTs 22U, 22V, and 22W are turned on and off in a predetermined switching pattern.

Figure 2:
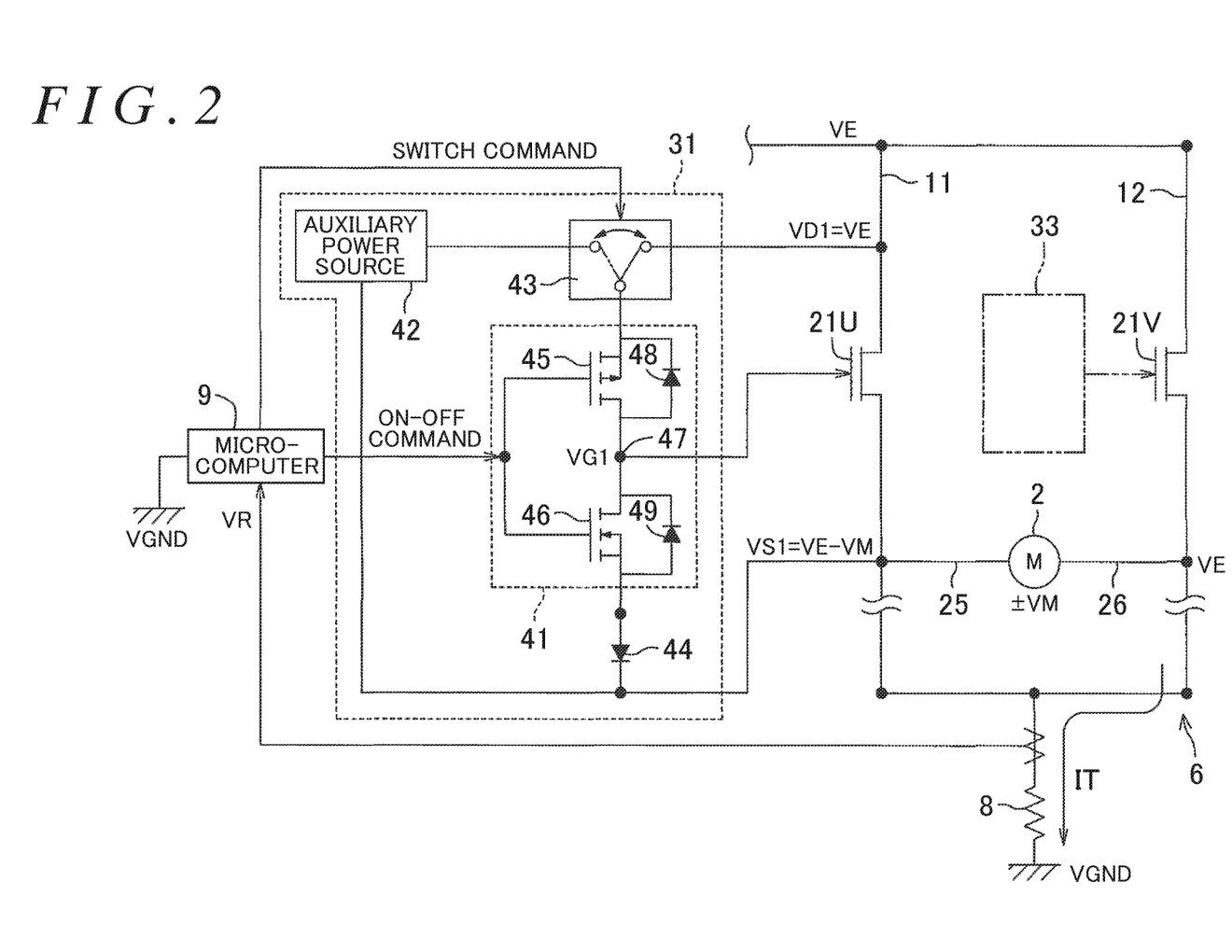
FIG. 2 is a circuit diagram illustrating an upper driver circuit unit for a U-phase arm circuit illustrated in FIG. 1.

As such, the first HEMTs 21U, 21V, and 21W, and the second HEMTs 22U, 22V, and 22W are turned on and off in the respective predetermined switching patterns, thereby converting DC power, from the DC power source 3, to alternating current (AC) to sinusoidally drive the three-phase motor 2. FIG. 2 is a circuit diagram of the U-phase upper driver circuit unit 31 illustrated in FIG. 1. The V-phase upper driver circuit unit 33 and the W-phase upper driver circuit unit 35 are almost identical in structure and circuit operation to the U-phase upper driver circuit unit 31.

For this reason, the structure and circuit operation of only the U-phase upper driver circuit unit 31 are described here as an example. The description of the U-phase upper driver circuit unit 31 made below applies similarly to the V-phase upper driver circuit unit 33 and the W-phase upper driver circuit unit 35, and therefore the descriptions of the V-phase upper driver circuit unit 33 and the W-phase upper driver circuit unit 35 are omitted. For the sake of brevity, FIG. 2 omits the W-phase arm circuit 13 and other components that are not referred to in the description of the U-phase upper driver circuit unit 31. The U-phase upper driver circuit unit 31 is connected to the microcomputer 9, the first gate electrode of the first HEMT 21U, the first drain electrode of the first HEMT 21U, and the first source electrode of the first HEMT 21U.

The U-phase upper driver circuit unit 31 includes a first output circuit unit 41, a first auxiliary power source 42, a first switch circuit unit 43 (a switch unit), and a first diode 44. The first output circuit unit 41 generates and outputs an on signal to the first gate electrode of the first HEMT 21U in response to an on command from the microcomputer 9. The first output circuit unit 41 generates and outputs an off signal to the first gate electrode of the first HEMT 21U in response to an off command from the microcomputer 9.

Specifically, the first output circuit unit 41 includes a series circuit of a p-type first upper metal insulator semiconductor field effect transistor (MISFET) 45 and an n-type first lower MISFET 46. More specifically, in the first output circuit unit 41, the p-type first upper MISFET 45 and the n-type first lower MISFET 46 are complementarily connected to form a first complementary metal insulator semiconductor (CMIS) circuit. The first CMIS circuit forms a NOT gate as an example of a logic circuit.

The first upper MISFET 45 includes a first upper gate electrode, a first upper source electrode, and a first upper drain electrode. The first lower MISFET 46 includes a first lower gate electrode, a first lower source electrode, and a first lower drain electrode. The first output circuit unit 41 is formed by connecting the first upper drain electrode of the first upper MISFET 45 to the first lower drain electrode of the first lower MISFET 46.

The first upper gate electrode of the first upper MISFET 45 and the first lower gate electrode of the first lower MISFET 46 are connected together to the microcomputer 9. A first connection node 47 between the first upper MISFET 45 and the first lower MISFET 46 is connected to the first gate electrode of the first HEMT 21U. A first upper freewheeling diode 48 is connected in parallel with the first upper MISFET 45 and is oriented such that forward current through the first upper freewheeling diode 48 flows from the first upper drain electrode of the first upper MISFET 45 to the first upper source electrode of the first upper MISFET 45.

A first lower freewheeling diode 49 is connected in parallel with the first lower MISFET 46 and is oriented such that forward current through the first lower freewheeling diode 49 flows from the first lower source electrode of the first lower MISFET 46 to the first lower drain electrode of the first lower MISFET 46. When the first output circuit unit 41 receives the on command from the microcomputer 9, the first upper MISFET 45 switches to an on state, and the first lower MISFET 46 switches to an off state. In this case, the first upper MISFET 45 generates and outputs the on signal to the first gate electrode of the first HEMT 21U.

When the first output circuit unit 41 receives the off command from the microcomputer 9, the first upper MISFET 45 switches to an off state, and the first lower MISFET 46 switches to an on state. In this case, the first lower MISFET 46 generates and outputs the off signal to the first gate electrode of the first HEMT 21U. The first auxiliary power source 42 is connectable via the first switch circuit unit 43 to the first upper source electrode of the first upper MISFET 45. The first auxiliary power source 42 outputs a predetermined positive voltage with respect to a source voltage of the first HEMT 21U.

The first switch circuit unit 43 is interposed between the first drain electrode of the first HEMT 21U, the first upper source electrode of the first upper MISFET 45, and the first auxiliary power source 42. The first switch circuit unit 43 is connected to the microcomputer 9. In accordance with a switch command from the microcomputer 9, the first switch circuit unit 43 switches between a first connection state and a second connection state so as to change a connection destination.

In the first connection state, the first switch circuit unit 43 connects the first upper source electrode of the first upper MISFET 45 to the first auxiliary power source 42. In the second connection state, the first switch circuit unit 43 connects the first upper source electrode of the first upper MISFET 45 to the first drain electrode of the first HEMT 21U. According to the embodiment, the first switch circuit unit 43 is normally controlled to be in the first connection state, and switches from the first connection state to the second connection state upon reception of the switch command from the microcomputer 9.

The first diode 44 is interposed between the first lower source electrode of the first lower MISFET 46 and the first source electrode of the first HEMT 21U, and is oriented such that forward current through the first diode 44 flows from the first lower source electrode of the first lower MISFET 46 to the first source electrode of the first HEMT 21U. Next, the circuit operation of the U-phase upper driver circuit unit 31 is specifically described. The following description describes how the U-phase upper driver circuit unit 31 operates in the event of a short circuit in the first HEMT 21V of the V-phase arm circuit 12.

The following description assumes that a motor phase voltage VM oscillates between plus five volts (+5 V) and minus five volts (−5 V), and that a power supply voltage VE is 12 V. The motor phase voltage VM is induced by rotation of the three-phase motor 2 and oscillates between positive and negative values. A first auxiliary power source voltage VSE1 of the first auxiliary power source 42 is 10 V, the first threshold voltage Vth1 of the first HEMT 21U is 3 V, and a ground voltage VGND is 0 V.

These voltage values are merely examples used to describe the circuit operation of the U-phase upper driver circuit unit 31, and are not intended to limit voltages associated with the circuits to any specific values. First, a description is made about how the U-phase upper driver circuit unit 31 operates if the microcomputer 9 does not output the switch command to the first switch circuit unit 43 in the event of a short circuit in the first HEMT 21V. The first auxiliary power source 42 is connected to the first upper source electrode of the first upper MISFET 45.

When the microcomputer 9 outputs the off command to the U-phase upper driver circuit unit 31, the first upper MISFET 45 switches to the off state, and the first lower MISFET 46 switches to the on state. Thus, electric current flows from the first HEMT 21U to the first diode 44 through the first lower MISFET 46. This causes a first forward voltage Vf1 across the first diode 44. The first forward voltage Vf1 is about 0.6 V.

When the motor phase voltage VM is 5 V, the first drain voltage VD1 of the first HEMT 21U (=VE) is 12 V. The first source voltage VS1 of the first HEMT 21U (=VE−VM) is 7 V. A first gate voltage VG1 of the first HEMT 21U (=VS1+Vf1) is 7.6 V. Thus, the first drain voltage VD1 is greater than or equal to the first source voltage VS1 (i.e., VD1≥VS1). More specifically, the first drain voltage VD1 is greater than the first source voltage VS1 (i.e., VD1>VS1). The first gate-source voltage VGS1 of the first HEMT 21U (=VG1−VS1) is 0.6 V.

Thus, the first gate-source voltage VGS1 is less than or equal to the first threshold voltage Vth1 of the first HEMT 21U (i.e., VGS1≤Vth1). More specifically, the first gate-source voltage VGS1 is less than the first threshold voltage Vth1 (i.e., VGS1<Vth1). Therefore, the first HEMT 21U switches to the off state, so that electric current does not flow between the three-phase motor 2 and the inverter circuit unit 6. On the other hand, when the motor phase voltage VM becomes −5 V, while the microcomputer 9 outputs the off command to the U-phase upper driver circuit unit 31, the first drain voltage VD1 of the first HEMT 21U (=VE) becomes 12 V. Thus, the first source voltage VS1 of the first HEMT 21U (=VE−VM) becomes 17 V.

The first gate voltage VG1 of the first HEMT 21U increases with the increase in the first source voltage VS1 and eventually reaches 17 V. The first drain voltage VD1 is less than the first source voltage VS1 (i.e., VD1<VS1). The first gate-drain voltage VGD1 of the first HEMT 21U (=VG1−VD1) is 5 V. Thus, the first gate-drain voltage VGD1 is greater than the first threshold voltage Vth1 of the first HEMT 21U (i.e., VGD1>Vth1). In this case, although the U-phase upper driver circuit unit 31 receives the off command from the microcomputer 9, the first HEMT 21U switches to the on state, so that electric current flows between the three-phase motor 2 and the inverter circuit unit 6.

In the electric power converter 1, in order to interrupt the current flow between the three-phase motor 2 and the inverter circuit unit 6, the U-phase upper driver circuit unit 31 performs the following control. When shoot-through current IT flows into the shunt resistor 8 due to a short circuit in the first HEMT 21V, the terminal voltage VR across the shunt resistor 8 increases. The terminal voltage VR is output to the microcomputer 9.

On the basis of the terminal voltage VR, the microcomputer 9 determines whether a short circuit occurs in any of the HEMTs (in this example, the first HEMT 21V). If determining that a short circuit occurs in any of the HEMTs (in this example, the first HEMT 21V), the microcomputer 9 outputs the off command to the U-phase upper driver circuit unit 31. Further, the microcomputer 9 outputs the switch command to the first switch circuit unit 43.

Thus, the first upper MISFET 45 switches to the off state, and the first lower MISFET 46 switches to the on state. Further, the first switch circuit unit 43 switches from the first connection state to the second connection state. As such, the first drain electrode of the first HEMT 21U is connected to the first upper source electrode of the first upper MISFET 45. When the motor phase voltage VM is +5 V, electric current flows through the first diode 44. This causes the first forward voltage Vf1 across the first diode 44. The first forward voltage Vf1 is about 0.6 V.

At this time, the first drain voltage VD1 of the first HEMT 21U (=VE) is 12 V. The first source voltage VS1 of the first HEMT 21U (=VE−VM) is 7 V. The first gate voltage VG1 of the first HEMT 21U (=VS1+Vf1) is 7.6 V. Thus, the first drain voltage VD1 is greater than or equal to the first source voltage VS1 (i.e., VD1≥VS1). More specifically, the first drain voltage VD1 is greater than the first source voltage VS1 (i.e., VD1>VS1). The first gate-source voltage VGS1 of the first HEMT 21U (=VG1−VS1) is 0.6 V.

Thus, the first gate-source voltage VGS1 is less than or equal to the first threshold voltage Vth1 of the first HEMT 21U (i.e., VGS1≤Vth1). More specifically, the first gate-source voltage VGS1 is less than the first threshold voltage Vth1 (i.e., VGS1<Vth1). Therefore, the first HEMT 21U switches to the off state, so that electric current does not flow between the three-phase motor 2 and the inverter circuit unit 6. On the other hand, when the motor phase voltage VM becomes −5 V, electric current flows through a closed circuit including the first HEMT 21U, the first upper MISFET 45, and the first switch circuit unit 43. In this case, the first diode 44 blocks the flow of electric current from the three-phase motor 2 to the first lower source electrode of the first lower MISFET 46.

At this time, a second forward voltage Vf2 appears across the first upper freewheeling diode 48. The second forward voltage Vf2 is about 0.6 V. Thus, the first drain voltage VD1 of the first upper MISFET 45, i.e., the first gate voltage VG1 of the first HEMT 21U is clamped to a value (=VE+Vf2) that is the sum of the power supply voltage VE (=VD1) and the second forward voltage Vf2. At this time, the first drain voltage VD1 of the first HEMT 21U (=VE) is 12 V. The first source voltage VS1 of the first HEMT 21U (=VE−VM) is 17 V. The first gate voltage VG1 (=VE+Vf2) is 12.6 V.

Thus, the first drain voltage VD1 is less than or equal to the first source voltage VS1 (i.e., VD1≥VS1). More specifically, the first drain voltage VD1 is less than the first source voltage VS1 (i.e., VD1<VS1). The first gate-drain voltage VGD1 of the first HEMT 21U (=VG1−VD1) becomes 0.6 V. Thus, the first gate-drain voltage VGD1 is less than or equal to the first threshold voltage Vth1 of the first HEMT 21U (i.e., VGD1≤Vth1). More specifically, the first gate-drain voltage VGD1 is less than the first threshold voltage Vth1 (i.e., VGD1<Vth1). Therefore, the first HEMT 21U switches to the off state, so that electric current does not flow between the three-phase motor 2 and the inverter circuit unit 6.

As described above, a short circuit may occur in any of the HEMTs (in this example, the first HEMT 21V), when the first drain voltage VD1 of the first HEMT 21U that is not short-circuited is greater than or equal to the first source voltage VS1 (i.e., VD1≥VS1). According to the U-phase upper driver circuit unit 31, if such a short circuit occurs, the first gate-source voltage VGS1 is controlled to be less than or equal to the first threshold voltage Vth1 of the first HEMT 21U (i.e., VGS1≤Vth1).

Further, a short circuit may occur in any of the HEMTs (in this example, the first HEMT 21V), when the first drain voltage VD1 of the first HEMT 21U that is not short-circuited is less than the first source voltage VS1 (i.e., VD1<VS1). According to the U-phase upper driver circuit unit 31, if such a short circuit occurs, the first gate-drain voltage VGD1 is controlled to be less than or equal to the first threshold voltage Vth1 of the first HEMT 21U (i.e., VGD1≤Vth1).

As such, when a short circuit occurs in any of the HEMTs (in this example, the first HEMT 21V), the U-phase upper driver circuit unit 31 forces the first HEMT 21U to the off state, regardless of whether the motor phase voltage VM is positive or negative, thereby keeping the first HEMT 21U from switching to the on state. Thus, when a short circuit occurs in any of the HEMTs (in this example, the first HEMT 21V), electric current does not flow between the first drain electrode and the first source electrode of the first HEMT 21U. As a result, electric current does not flow between the three-phase motor 2 and the inverter circuit unit 6.

Figure 3:
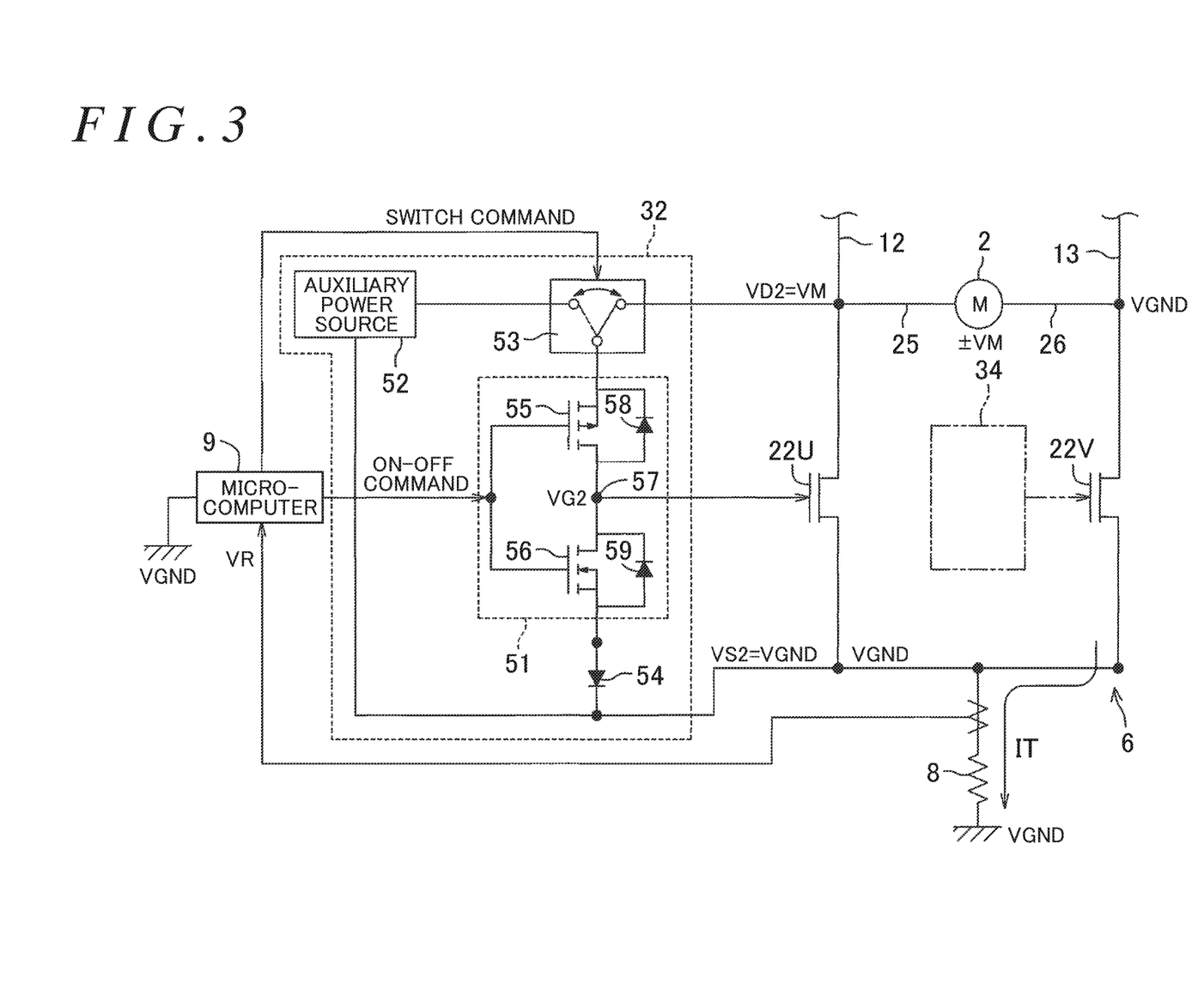
FIG. 3 is a circuit diagram illustrating a lower driver circuit unit for the U-phase arm circuit illustrated in FIG. 1.

FIG. 3 is a circuit diagram of the U-phase lower driver circuit unit 32 illustrated in FIG. 1. The V-phase lower driver circuit unit 34 and the W-phase lower driver circuit unit 36 are almost identical in structure and circuit operation to the U-phase lower driver circuit unit 32. For this reason, the structure and circuit operation of only the U-phase lower driver circuit unit 32 are described here. The description of the U-phase lower driver circuit unit 32 made below applies similarly to the V-phase lower driver circuit unit 34 and the W-phase lower driver circuit unit 36, and therefore the descriptions of the V-phase lower driver circuit unit 34 and the W-phase lower driver circuit unit 36 are omitted. For the sake of brevity, FIG. 3 omits the W-phase arm circuit 13 and other components that are not referred to in the description of the U-phase lower driver circuit unit 32.

The U-phase lower driver circuit unit 32 is connected to the microcomputer 9, the second gate electrode of the second HEMT 22U, the second drain electrode of the second HEMT 22U, and the second source electrode of the second HEMT 22U. The U-phase lower driver circuit unit 32 includes a second output circuit unit 51, a second auxiliary power source 52, a second switch circuit unit 53 (a switch unit), and a second diode 54.

The second output circuit unit 51 generates and outputs an on signal to the second gate electrode of the second HEMT 22U in response to an on command from the microcomputer 9. The second output circuit unit 51 generates and outputs an off signal to the second gate electrode of the second HEMT 22U in response to an off command from the microcomputer 9. Specifically, the second output circuit unit 51 includes a series circuit of a p-type second upper MISFET 55 and an n-type second lower MISFET 56.

More specifically, in the second output circuit unit 51, the second upper MISFET 55 and the second lower MISFET 56 are complementarily connected to form a second CMIS circuit. The second CMIS circuit forms a NOT gate as an example of a logic circuit. The second upper MISFET 55 includes a second upper gate electrode, a second upper source electrode, and a second upper drain electrode. The second lower MISFET 56 includes a second lower gate electrode, a second lower source electrode, and a second lower drain electrode.

The second output circuit unit 51 is formed by connecting the second upper drain electrode of the second upper MISFET 55 to the second lower drain electrode of the second lower MISFET 56. The second upper gate electrode of the second upper MISFET 55 and the second lower gate electrode of the second lower MISFET 56 are connected together to the microcomputer 9. A second connection node 57 between the second upper MISFET 55 and the second lower MISFET 56 is connected to the second gate electrode of the second HEMT 22U.

A second upper freewheeling diode 58 is connected in parallel with the second upper MISFET 55 and is oriented such that forward current through the second upper freewheeling diode 58 flows from the second upper drain electrode of the second upper MISFET 55 to the second upper source electrode of the second upper MISFET 55. A second lower freewheeling diode 59 is connected in parallel with the second lower MISFET 56 and is oriented such that forward current through the second lower freewheeling diode 59 flows from the second upper source electrode of the second lower MISFET 56 to the second lower drain electrode of the second lower MISFET 56.

When the second output circuit unit 51 receives the on command from the microcomputer 9, the second upper MISFET 55 switches to an on state, and the second lower MISFET 56 switches to an off state. In this case, the second upper MISFET 55 generates and outputs the on signal to the second gate electrode of the second HEMT 22U. When the second output circuit unit 51 receives the off command from the microcomputer 9, the second upper MISFET 55 switches to an off state, and the second lower MISFET 56 switches to an on state. In this case, the second lower MISFET 56 generates and outputs the off signal to the second gate electrode of the second HEMT 22U.

The second auxiliary power source 52 is connectable via the second switch circuit unit 53 to the second upper source electrode of the second upper MISFET 55. The second auxiliary power source 52 outputs a predetermined positive voltage with respect to a source voltage of the second HEMT 22U. The second switch circuit unit 53 is interposed between the second drain electrode of the second HEMT 22U, the second upper source electrode of the second upper MISFET 55, and the second auxiliary power source 52. The second switch circuit unit 53 is connected to the microcomputer 9.

In accordance with a switch command from the microcomputer 9, the second switch circuit unit 53 switches between a first connection state and a second connection state so as to change a connection destination. In the first connection state, the second switch circuit unit 53 connects the second upper source electrode of the second upper MISFET 55 to the second auxiliary power source 52. In the second connection state, the second switch circuit unit 53 connects the second upper source electrode of the second upper MISFET 55 to the second drain electrode of the second HEMT 22U.

According to the embodiment, the second switch circuit unit 53 is normally controlled to be in the first connection state, and switches from the first connection state to the second connection state upon reception of the switch command from the microcomputer 9. The second diode 54 is interposed between the second lower source electrode of the second lower MISFET 56 and the second source electrode of the second HEMT 22U, and is oriented such that forward current through the second diode 54 flows from the second lower source electrode of the second lower MISFET 56 to the second source electrode of the second HEMT 22U.

Next, the circuit operation of the U-phase lower driver circuit unit 32 is specifically described. The following description describes how the U-phase lower driver circuit unit 32 operates in the event of a short circuit in the second HEMT 22V of the V-phase arm circuit 12. As in the case of the description of the U-phase upper driver circuit unit 31, the following description assumes that the motor phase voltage VM oscillates between +5 V and −5 V, and that the power supply voltage VE is 12 V. A second auxiliary power source voltage VSE2 of the second auxiliary power source 52 is 10 V, the second threshold voltage Vth2 of the second HEMT 22U is 3 V, and the ground voltage VGND is 0 V.

These voltage values are merely examples used to describe the circuit operation of the U-phase lower driver circuit unit 32, and are not intended to limit voltages associated with the circuits to any specific values. First, a description is made about how the U-phase lower driver circuit unit 32 operates if the microcomputer 9 does not output the switch command to the second switch circuit unit 53 in the event of a short circuit in the second HEMT 22V. The second auxiliary power source 52 is connected to the second upper source electrode of the second upper MISFET 55.

When the microcomputer 9 outputs the off command to the U-phase lower driver circuit unit 32, the second upper MISFET 55 switches to the off state, and the second lower MISFET 56 switches to the on state. Thus, electric current flows from the second HEMT 22U to the second diode 54 through the second lower MISFET 56. This causes a third forward voltage Vf3 across the second diode 54. The third forward voltage Vf3 is about 0.6 V.

When the motor phase voltage VM is 5 V, the second drain voltage VD2 of the second HEMT 22U (=VM) is 5 V. The second source voltage VS2 of the second HEMT 22U (=VGND) is 0 V. A second gate voltage VG2 of the second HEMT 22U (=VGND+Vf3) is 0.6 V. Thus, the second drain voltage VD2 is greater than or equal to the second source voltage VS2 (i.e., VD2≥VS2). More specifically, the second drain voltage VD2 is greater than the second source voltage VS2 (i.e., VD2>VS2). The second gate-source voltage VGS2 of the second HEMT 22U (=VG2−VS2) is 0.6 V.

Thus, the second gate-source voltage VGS2 is less than or equal to the second threshold voltage Vth2 of the second HEMT 22U (i.e., VGS2≤Vth2). More specifically, the second gate-source voltage VGS2 is less than the second threshold voltage Vth2 (i.e., VGS2<Vth2). Therefore, the second HEMT 22U switches to the off state, so that electric current does not flow between the three-phase motor 2 and the inverter circuit unit 6. On the other hand, when the motor phase voltage VM becomes −5 V, while the microcomputer 9 outputs the off command to the U-phase lower driver circuit unit 32, the second drain voltage VD2 of the second HEMT 22U (=VE) becomes −5 V. The second source voltage VS2 of the second HEMT 22U (=VGND) is 0 V. The second gate voltage VG2 of the second HEMT 22U (=VGND+Vf3) is 0.6 V.

The second drain voltage VD2 is less than the second source voltage VS2 (i.e., VD2<VS2). The second gate-drain voltage VGD2 of the second HEMT 22U (=VG2−VD2) is 5.6 V. Thus, the second gate-drain voltage VGD2 is greater than the second threshold voltage Vth2 of the second HEMT 22U (i.e., VGD2>Vth2). In this case, although the U-phase lower driver circuit unit 32 receives the off command from the microcomputer 9, the second HEMT 22U switches to the on state, so that electric current flows between the three-phase motor 2 and the inverter circuit unit 6.

In the electric power converter 1, in order to interrupt the current flow between the three-phase motor 2 and the inverter circuit unit 6, the U-phase lower driver circuit unit 32 performs the following control. When the shoot-through current IT flows into the shunt resistor 8 due to a short circuit in the second HEMT 22U, the terminal voltage VR across the shunt resistor 8 increases. The terminal voltage VR is output to the microcomputer 9.

If determining, on the basis of the terminal voltage VR, that a short circuit occurs in any of the HEMTs (in this example, the second HEMT 22V), the microcomputer 9 outputs the off command to the U-phase lower driver circuit unit 32. Further, the microcomputer 9 outputs the switch command to the second switch circuit unit 53. Thus, the second upper MISFET 55 switches to the off state, and the second lower MISFET 56 switches to the on state. Further, the second switch circuit unit 53 switches from the first connection state to the second connection state. As such, the second upper source electrode of the second upper MISFET 55 is connected to the second drain electrode of the second HEMT 22U.

When the motor phase voltage VM is +5 V, electric current flows through the second diode 54. This causes the third forward voltage Vf3 across the second diode 54. The third forward voltage Vf3 is about 0.6 V. At this time, the second drain voltage VD2 of the second HEMT 22U (=VM) is +5 V. The second source voltage VS2 of the second HEMT 22U (=VGND) is 0 V. The second gate voltage VG2 of the second HEMT 22U (=VGND+Vf3) is 0.6 V.

Thus, the second drain voltage VD2 is greater than or equal to the second source voltage VS2 (i.e., VD2≥VS2). More specifically, the second drain voltage VD2 is greater than the second source voltage VS2 (i.e., VD2>VS2). The second gate-source voltage VGS2 of the second HEMT 22U (=VG2−VS2) is 0.6 V. Thus, the second gate-source voltage VGS2 is less than or equal to the second threshold voltage Vth2 of the second HEMT 22U (i.e., VGS2≤Vth2). More specifically, the second gate-source voltage VGS2 is less than the second threshold voltage Vth2 (i.e., VGS2<Vth2). Therefore, the second HEMT 22U switches to the off state, so that electric current does not flow between the three-phase motor 2 and the inverter circuit unit 6.

On the other hand, when the motor phase voltage VM becomes −5 V, electric current flows through a closed circuit including the second HEMT 22U, the second upper MISFET 55, and the second switch circuit unit 53. In this case, the second diode 54 blocks the flow of electric current from the three-phase motor 2 to the second lower source electrode of the second lower MISFET 56. At this time, a fourth forward voltage Vf4 appears across the second upper freewheeling diode 58. The fourth forward voltage Vf4 is about 0.6 V. Thus, the second gate voltage VG2 of the second HEMT 22U is clamped to a value (=VD2+Vf4) that is the sum of the second drain voltage VD2 and the fourth forward voltage Vf4.

At this time, the second drain voltage VD2 of the second HEMT 22U (=VM) is −5 V. The second source voltage VS2 of the second HEMT 22U (=VGND) is 0 V. The second gate voltage VG2 (=VD2+Vf4) is −4.4 V. The second gate-drain voltage VGD2 of the second HEMT 22U (=VG2−VD2) is 0.6 V.

Thus, the second gate-drain voltage VGD2 is less than or equal to the second threshold voltage Vth2 of the second HEMT 22U (i.e., VGD2≤Vth2). More specifically, the second gate-drain voltage VGD2 is less than the second threshold voltage Vth2 (i.e., VGD2<Vth2). Therefore, the second HEMT 22U switches to the off state, so that electric current does not flow between the three-phase motor 2 and the inverter circuit unit 6.

As described above, a short circuit may occur in any of the HEMTs (in this example, the second HEMT 22V), when the second drain voltage VD2 of the second HEMT 22U that is not short-circuited is greater than or equal to the second source voltage VS2 (i.e., VD2≥VS2). According to the U-phase lower driver circuit unit 32, if such a short circuit occurs, the second gate-source voltage VGS2 of the second HEMT 22U is controlled to be less than or equal to the second threshold voltage Vth2 of the second HEMT 22U (i.e., VGS2≤Vth2).

Further, a short circuit may occur in any of the HEMTs (in this example, the second HEMT 22V), when the second drain voltage VD2 of the second HEMT 22U that is not short-circuited is less than the second source voltage VS2 (i.e., VD2<VS2). According to the U-phase lower driver circuit unit 32, if such a short circuit occurs, the second gate-drain voltage VGD2 of the second HEMT 22U is controlled to be less than or equal to the second threshold voltage Vth2 of the second HEMT 22U (i.e., VGD2≤Vth2).

As such, when a short circuit occurs in any of the HEMTs (in this example, the second HEMT 22V), the U-phase lower driver circuit unit 32 forces the second HEMT 22U to the off state, regardless of whether the motor phase voltage VM is positive or negative, thereby keeping the second HEMT 22U from switching to the on state. Thus, when a short circuit occurs in any of the HEMTs (in this example, the second HEMT 22V), electric current does not flow between the second drain electrode and the second source electrode of the second HEMT 22U. As a result, electric current does not flow between the three-phase motor 2 and the inverter circuit unit 6.

Figure 4:
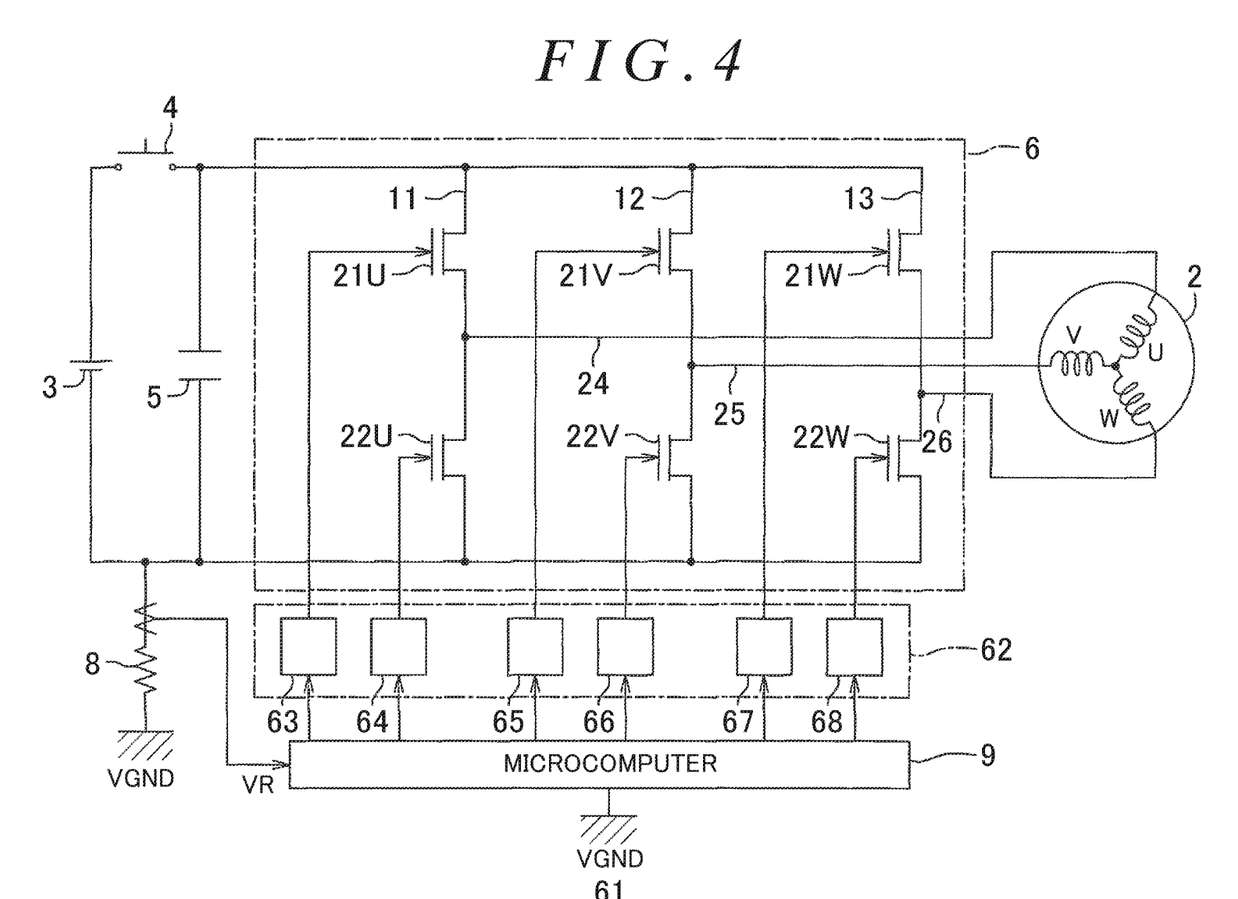
FIG. 4 is a circuit diagram illustrating an electric power converter according to a reference example of the invention.

In conclusion, according to the electric power converter 1, there is no need to interpose motor relays between the three-phase motor 2 and the inverter circuit unit 6. This leads to a reduction in the number of components of the electric power converter 1, thus making it possible to reduce the cost and size of the electric power converter 1. FIG. 4 is a circuit diagram illustrating an electric power converter 61 according to a reference example of the invention. Like elements between the electric power converters 1 and 61 are represented by like reference symbols and are not described again here.

According to the electric power converter 61, a first HEMT 21U, a second HEMT 22U, a first HEMT 21V, a second HEMT 22V, a first HEMT 21W, and a second HEMT 22W are either normally-off devices or normally-on devices. The following description assumes that the first HEMT 21U, the second HEMT 22U, the first HEMT 21V, the second HEMT 22V, the first HEMT 21W, and the second HEMT 22W are all normally-on devices.

Each of the first HEMTs 21U, 21V, and 21W has a first threshold voltage Vth11. The first HEMTs 21U, 21V, and 21W switch from an on state to an off state, when both the following conditions are satisfied: a first drain voltage VD1 is greater than or equal to a first source voltage VS1 (i.e., VD1≥VS1); and a first gate-source voltage VGS1 between a first gate electrode and a first source electrode is less than or equal to the first threshold voltage Vth11 (i.e., VGS1≤Vth11).

Then, the first HEMTs 21U, 21V, and 21W switch from the off state back to the on state, when the first gate-source voltage VGS1 exceeds the first threshold voltage Vth11 (i.e., VGS1>Vth11). Further, the first HEMTs 21U, 21V, and 21W switch from the on state to the off state, when both the following conditions are satisfied: the first drain voltage VD1 is less than the first source voltage VS1 (i.e., VD1<VS1); and a first gate-drain voltage VGD1 between the first gate electrode and a first drain electrode is less than or equal to the first threshold voltage Vth11 (i.e., VGD1≤Vth11).

Then, the first HEMTs 21U, 21V, and 21W switch from the off state back to the on state, when the first gate-drain voltage VGD1 exceeds the first threshold voltage Vth11 (i.e., VGD1>Vth11). Each of the second HEMTs 22U, 22V, and 22W has a second threshold voltage Vth12. The second HEMTs 22U, 22V, and 22W switch from an on state to an off state, when both the following conditions are satisfied: a second drain voltage VD2 is greater than or equal to a second source voltage VS2 (i.e., VD2≥VS2); and a second gate-source voltage VGS2 between a second gate electrode and a second source electrode is less than or equal to the second threshold voltage Vth12 (i.e., VGS2≤Vth12).

Then, the second HEMTs 22U, 22V, and 22W switch from the off state back to the on state, when the second gate-source voltage VGS2 exceeds the second threshold voltage Vth12 (i.e., VGS2>Vth12). Further, the second HEMTs 22U, 22V, and 22W switch from the on state to the off state, when both the following conditions are satisfied: the second drain voltage VD2 is less than the second source voltage VS2 (i.e., VD2<VS2); and a second gate-drain voltage VGD2 between the second gate electrode and a second drain electrode is less than or equal to the second threshold voltage Vth12 (i.e., VGD2≤Vth12).

Then, the second HEMTs 22U, 22V, and 22W switch from the off state back to the on state, when the second gate-drain voltage VGD2 exceeds the second threshold voltage Vth12 (i.e., VGD2>Vth12). The electric power converter 61 includes a driver circuit 62 instead of the driver circuit unit 7. The driver circuit 62 includes a U-phase upper driver circuit unit 63, a U-phase lower driver circuit unit 64, a V-phase upper driver circuit unit 65, a V-phase lower driver circuit unit 66, a W-phase upper driver circuit unit 67, and a W-phase lower driver circuit unit 68.

Figure 5:
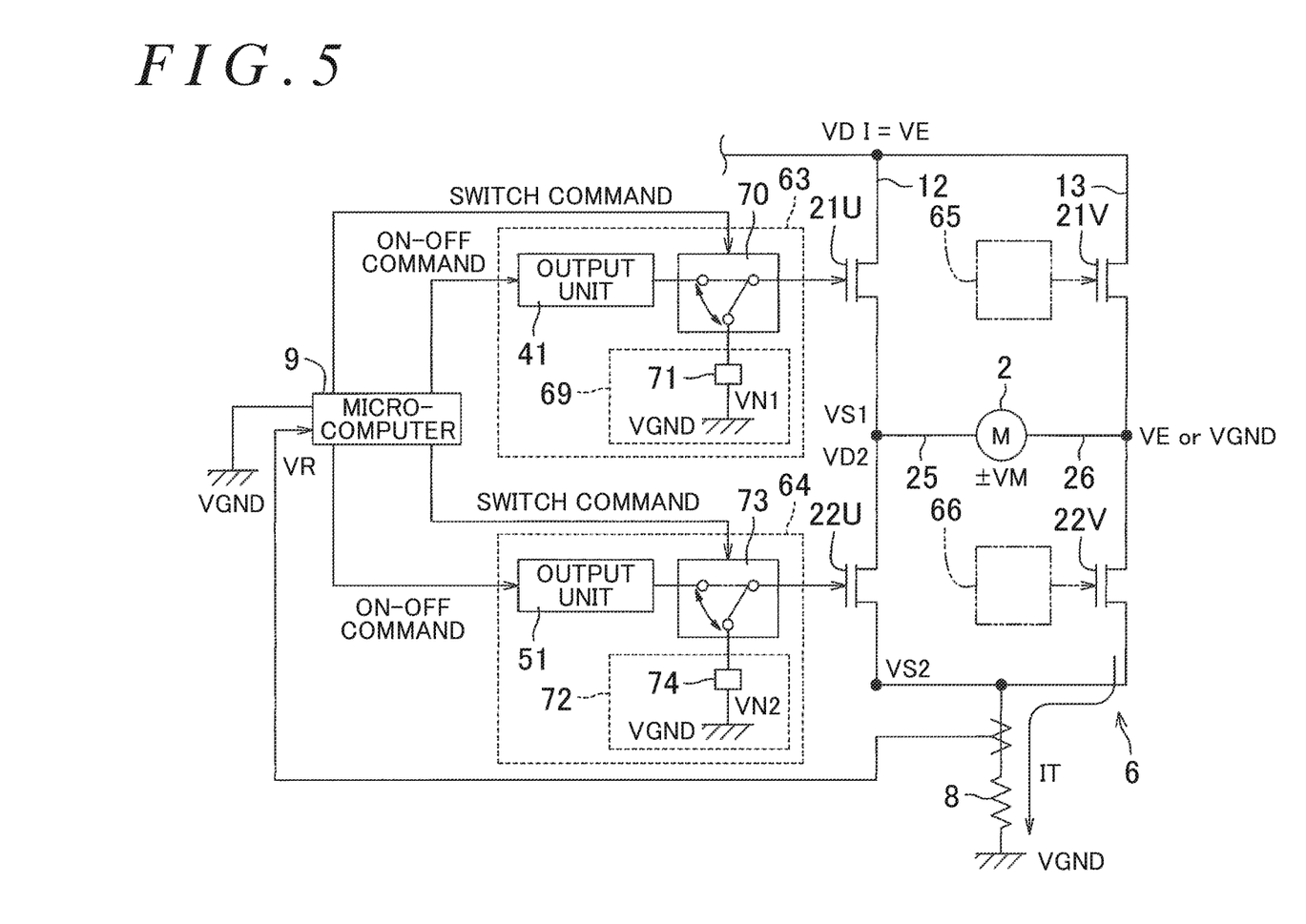
FIG. 5 is a circuit diagram illustrating an upper driver circuit unit and a lower driver circuit unit for a U-phase arm circuit illustrated in FIG. 4.

FIG. 5 is a circuit diagram illustrating the U-phase upper driver circuit unit 63 and the U-phase lower driver circuit unit 64 for the U-phase arm circuit 11 illustrated in FIG. 4. The V-phase upper driver circuit unit 65 and the W-phase upper driver circuit unit 67 are almost identical in structure and circuit operation to the U-phase upper driver circuit unit 63.

For this reason, the description of the U-phase upper driver circuit unit 63 made below applies similarly to the V-phase upper driver circuit unit 65 and the W-phase upper driver circuit unit 67, and therefore the descriptions of the V-phase upper driver circuit unit 65 and the W-phase upper driver circuit unit 67 are omitted. The V-phase lower driver circuit unit 66 and the W-phase lower driver circuit unit 68 are almost identical in structure and circuit operation to the U-phase lower driver circuit unit 64.

For this reason, the description of the U-phase lower driver circuit unit 64 made below applies similarly to the V-phase lower driver circuit unit 66 and the W-phase lower driver circuit unit 68, and therefore the descriptions of the V-phase lower driver circuit unit 66 and the W-phase lower driver circuit unit 68 are omitted. The structure and circuit operation of the U-phase upper driver circuit unit 63 are described first, and then the structure and circuit operation of the U-phase lower driver circuit unit 64 are described.

Referring to FIG. 5, the U-phase upper driver circuit unit 63 includes the first output circuit unit 41, a first forced-off-signal output unit 69, and a first switch circuit unit 70. As in the electric power converter 1, the first output circuit unit 41 is formed by connecting the first upper drain electrode of the first upper MISFET 45 to the first lower drain electrode of the first lower MISFET 46.

The first connection node 47 between the first upper MISFET 45 and the first lower MISFET 46 is connectable via the first switch circuit unit 70 to the first gate electrode of the first HEMT 21U. The first forced-off-signal output unit 69 is also connectable via the first switch circuit unit 70 to the first gate electrode of the first HEMT 21U. The first forced-off-signal output unit 69 outputs, to the first gate electrode of the first HEMT 21U via the first switch circuit unit 70, a forced-off-signal that forces the first HEMT 21U to the off state.

According to the reference example, the first forced-off-signal output unit 69 includes a first power source 71 and outputs, as the forced-off-signal, a predetermined first voltage $VN1$ to the first gate electrode of the first HEMT 21U. The first voltage $VN1$ is defined with respect to a ground voltage $VGND$. On the basis of the first threshold voltage $Vth11$ of the first HEMT 21U, the motor phase voltage $VM$, and the power supply voltage $VE$, the first voltage $VN1$ is set less than or equal to the value of the following expression: $Vth11-|VM|+VE$ (i.e., $VN1 \leq Vth11-|VM|+VE$). It is preferable that the first voltage $VN1$ be set less than the value of the following expression: $Vth11-|VM|+VE$ (i.e., $VN1 < Vth11-|VM|+VE$).

The first switch circuit unit 70 is interposed between the first HEMT 21U, the first output circuit unit 41, and the first forced-off-signal output unit 69. The first switch circuit unit 70 is connected to a microcomputer 9. In accordance with a switch command from the microcomputer 9, the first switch circuit unit 70 switches between a first connection state and a second connection state so as to change a connection destination.

In the first connection state, the first switch circuit unit 70 connects the first gate electrode of the first HEMT 21U to the first output circuit unit 41. In the second connection state, the first switch circuit unit 70 connects the first gate electrode of the first HEMT 21U to the first forced-off-signal output unit 69. According to the reference example, the first switch circuit unit 70 is normally controlled to be in the first connection state, and switches from the first connection state to the second connection state upon reception of the switch command from the microcomputer 9.

Next, the circuit operation of the U-phase upper driver circuit unit 63 is specifically described. The following description describes how the U-phase upper driver circuit unit 63 operates in the event of a short circuit in the first HEMT 21V of the V-phase arm circuit 12. When shoot-through current IT flows into a shunt resistor 8 due to a short circuit in the first HEMT 21V, a terminal voltage $VR$ across the shunt resistor 8 increases. The terminal voltage $VR$ is output to the microcomputer 9.

On the basis of the terminal voltage $VR$, the microcomputer 9 determines whether a short circuit occurs in any of the HEMTs (in this example, the first HEMT 21V). If determining that a short circuit occurs in any of the HEMTs (in this example, the first HEMT 21V), the microcomputer 9 outputs the switch command to the first switch circuit unit 70. Thus, the first forced-off-signal output unit 69 is connected to the first gate electrode of the first HEMT 21U so that the forced-off-signal is output to the first gate electrode of the first HEMT 21U.

As in the case of in the preceding description, the following description assumes that the motor phase voltage $VM$ oscillates between +5 V and −5 V, and that the power supply voltage $VE$ is 12 V. The first threshold voltage $Vth11$ of the first HEMT 21U is −3 V, and the ground voltage $VGND$ is 0 V. First, when the motor phase voltage $VM$ is +5 V, the first drain voltage $VD1$ of the first HEMT 21U $(=VE)$ is 12 V. The first source voltage $VS1$ of the first HEMT 21U $(=VE+VM)$ is 17 V. The first gate voltage $VG1$ of the first HEMT 21U $Vth11-|VM|+VE)$ is less than or equal to 4 V.

Thus, the first drain voltage $VD1$ is less than or equal to the first source voltage $VS1$ (i.e., $VD1 \geq VS1$). More specifically, the first drain voltage $VD1$ is less than the first source voltage $VS1$ (i.e., $VD1<VS1$). The first gate-drain voltage $VGD1$ of the first HEMT 21U $(=VG1-VD1)$ is less than or equal to −8 V. Thus, the first gate-drain voltage $VGD1$ is less than or equal to the first threshold voltage $Vth11$ of the first HEMT 21U (i.e., $VGD1 \leq Vth11$). More specifically, the first gate-drain voltage $VGD1$ is less than the first threshold voltage $Vth11$ of the first HEMT 21U (i.e., $VGD1<Vth11$). Therefore, the first HEMT 21U switches to the off state, so that electric current does not flow between the three-phase motor 2 and the inverter circuit unit 6.

On the other hand, when the motor phase voltage $VM$ becomes −5 V, the first drain voltage $VD1$ of the first HEMT 21U $(=VE)$ is 12 V. The first source voltage $VS1$ of the first HEMT 21U $(=VE+VM)$ is 7 V. The first gate voltage $VG1$ of the first HEMT 21U $Vth11-|VM|+VE)$ is less than or equal to 4 V. Thus, the first drain voltage $VD1$ is greater than or equal to the first source voltage $VS1$ (i.e., $VD1 \geq VS1$). More specifically, the first drain voltage $VD1$ is greater than the first source voltage $VS1$ (i.e., $VD1>VS1$). The first gate-source voltage $VGS1$ of the first HEMT 21U $(=VG1-VS1)$ is less than or equal to −3 V.

Thus, the first gate-source voltage $VGS1$ is less than or equal to the first threshold voltage $Vth11$ of the first HEMT 21U (i.e., $VGS1 \leq Vth11$). Therefore, the first HEMT 21U switches to the off state, so that electric current does not flow between the three-phase motor 2 and the inverter circuit unit 6. In this case, it is possible to ensure that the first gate-source voltage $VGS1$ becomes less than the first threshold voltage $Vth11$ (i.e., $VGS1<Vth11$) by setting the first voltage VN1 to be less than the value of the following expression: Vth11−|VM|+VE (i.e., VN1<Vth11−|VM|+VE).

As described above, according to the U-phase upper driver circuit unit 63, when a short circuit occurs in any of the HEMTs (in this example, the first HEMT 21V), the first forced-off-signal output unit 69 outputs the forced-off-signal to the first HEMT 21U that is not short-circuited. In one case, when the forced-off-signal is output, the first drain voltage VD1 of the first HEMT 21U is less than the first source voltage VS1 of the first HEMT 21U (i.e., VD1<VS1). In this case, the forced-off-signal causes the first gate-drain voltage VGD1 of the first HEMT 21U to be less than or equal to the first threshold voltage Vth11 of the first HEMT 21U (i.e., VGD1≤Vth11).

In the other case, when the forced-off-signal is output, the first drain voltage VD1 of the first HEMT 21U is greater than or equal to the first source voltage VS1 of the first HEMT 21U (VD1>VS1). In this case, the forced-off-signal causes the first gate-source voltage VGS1 of the first HEMT 21U to be less than or equal to the first threshold voltage Vth11 of the first HEMT 21U (i.e., VGS1≤Vth11). According to the reference example, the first voltage VN1 from the first power source 71 serves as the forced-off-signal. On the basis of the first threshold voltage Vth11 of the first HEMT 21U, the motor phase voltage VM, and the power supply voltage VE, the first voltage VN1 is set less than or equal to the value of the following expression: Vth11−|VM|+VE (i.e., VN1≤Vth11−|VM|+VE).

As such, when a short circuit occurs in any of the HEMTs (in this example, the first HEMT 21V), the U-phase upper driver circuit unit 63 keeps the first HEMT 21U from switching to the on state, regardless of whether the motor phase voltage VM is positive or negative. Thus, when a short circuit occurs in any of the HEMTs (in this example, the first HEMT 21V), electric current does not flow between the first drain electrode and the first source electrode of the first HEMT 21U. As a result, electric current does not flow between the three-phase motor 2 and the inverter circuit unit 6.

Referring to FIG. 5, the U-phase lower driver circuit unit 64 includes the second output circuit unit 51, a second forced-off-signal output unit 72, and a second switch circuit unit 73. As in the electric power converter 1, the second output circuit unit 51 is formed by connecting the second upper drain electrode of the second upper MISFET 55 to the second lower drain electrode of the second lower MISFET 56.

The second connection node 57 between the second upper MISFET 55 and the second lower MISFET 56 is connectable via the second switch circuit unit 73 to the second gate electrode of the second HEMT 22U. The second forced-off-signal output unit 72 is also connectable via the second switch circuit unit 73 to the second gate electrode of the second HEMT 22U. The second forced-off-signal output unit 72 outputs, to the second gate electrode of the second HEMT 22U via the second switch circuit unit 73, a forced-off-signal that forces the second HEMT 22U to the off state.

According to the reference example, the second forced-off-signal output unit 72 includes a second power source 74 and outputs, as the forced-off-signal, a predetermined second voltage VN2 to the second gate electrode of the second HEMT 22U. The second voltage VN2 is defined with respect to the ground voltage VGND. On the basis of the second threshold value Vth12 of the second HEMT 22U and the motor phase voltage VM, the second voltage VN2 is set less than or equal to the value of the following expression: Vth12−|VM| (i.e., VN2≤Vth12−|VM|). It is preferable that the second voltage VN2 be set less than the value of the following expression: Vth12−|VM| (i.e., VN2<Vth12−|VM|).

The second switch circuit unit 73 is interposed between the second HEMT 22U, the second output circuit unit 51, and the second forced-off-signal output unit 72. The second switch circuit unit 73 is connected to the microcomputer 9. In accordance with a switch command from the microcomputer 9, the second switch circuit unit 73 switches between a first connection state and a second connection state so as to change a connection destination.

In the first connection state, the second switch circuit unit 73 connects the second gate electrode of the second HEMT 22U to the second output circuit unit 51. In the second connection state, the second switch circuit unit 73 connects the second gate electrode of the second HEMT 22U to the second forced-off-signal output unit 72. According to the reference example, the second switch circuit unit 73 is normally controlled to be in the first connection state, and switches from the first connection state to the second connection state upon reception of the switch command from the microcomputer 9.

Next, the circuit operation of the U-phase lower driver circuit unit 64 is specifically described. The following description describes how the U-phase lower driver circuit unit 64 operates in the event of a short circuit in the second HEMT 22V of the V-phase arm circuit 12. When the shoot-through current IT flows into the shunt resistor 8 due to a short circuit in the second HEMT 22V, the terminal voltage VR across the shunt resistor 8 increases. The terminal voltage VR is output to the microcomputer 9.

On the basis of the terminal voltage VR, the microcomputer 9 determines whether a short circuit occurs in any of the HEMTs (in this example, the second HEMT 22V). If determining that a short circuit occurs in any of the HEMTs (in this example, the second HEMT 22V), the microcomputer 9 outputs the switch command to the second switch circuit unit 73. Thus, the second forced-off-signal output unit 72 is connected to the second gate electrode of the second HEMT 22U so that the forced-off-signal is output to the second gate electrode of the second HEMT 22U.

As in the case of the preceding embodiment, the following description assumes that the motor phase voltage VM oscillates between +5 V and −5 V, and that the power supply voltage VE is 12 V. The second threshold voltage Vth12 of the second HEMT 22U is −3 V, and the ground voltage VGND is 0 V. First, when the motor phase voltage VM is +5 V, the second drain voltage VD2 of the second HEMT 22U (=VE) is 5 V. The second source voltage VS2 of the second HEMT 22U (=VGND) is 0 V. The second gate voltage VG2 of the second HEMT 22U (≤Vth12−|VM|) is less than or equal to −8 V.

Thus, the second drain voltage VD2 is greater than or equal to the second source voltage VS2 (VD2≥VS2). More specifically, the second drain voltage VD2 is greater than the second source voltage VS2 (i.e., VD2>VS2). The second gate-source voltage VGS2 of the second HEMT 22U (=VG2−VS2) is less than or equal to −8 V. Thus, the second gate-source voltage VGS2 is less than or equal to the second threshold voltage Vth12 of the second HEMT 22U (i.e., VGS2≤Vth12). More specifically, the second gate-source voltage VGS2 is less than the second threshold voltage Vth12 (i.e., VGS2<Vth12). Therefore, the second HEMT 22U switches to the off state, so that electric current does not flow between the three-phase motor 2 and the inverter circuit unit 6.

Meanwhile, when the motor phase voltage VM becomes −5 V, the second drain voltage VD2 of the second HEMT 22U (=VE) becomes −5 V. The second source voltage VS2 of the second HEMT 22U (=VGND) is 0 V. The second gate voltage VG2 of the second HEMT 22U (≤Vth12−|VM|) is less than or equal to −8 V. The second drain voltage VD2 is less than or equal to the second source voltage VS2 (i.e., VD2≥VS2). The second gate-drain voltage VGD2 of the second HEMT 22U (=VG2−VD2) is less than or equal to −3 V.

Thus, the second gate-drain voltage VGD2 is less than or equal to the second threshold voltage Vth12 of the second HEMT 22U (i.e., VGD2≤Vth12). Therefore, the second HEMT 22U switches to the off state, so that electric current does not flow between the three-phase motor 2 and the inverter circuit unit 6. In this case, it is possible to ensure that the second gate-drain voltage VGD2 becomes less than the second threshold value Vth12 (i.e., VGD2<Vth12) by setting the second voltage VN2 to be less than the value of the following expression: Vth12−|VM| (i.e., VN2<Vth12−|VM|).

As described above, according to the U-phase lower driver circuit unit 64, when a short circuit occurs in any of the HEMTs (in this example, the second HEMT 22V), the second forced-off-signal output unit 72 outputs the forced-off-signal to the second HEMT 22U that is not short-circuited. In one case, when the forced-off-signal is output, the second drain voltage VD2 of the second HEMT 22U is greater than or equal to the second source voltage VS2 of the second HEMT 22U (i.e., VD2>VS2). In this case, the forced-off-signal causes the second gate-source voltage VGS2 of the second HEMT 22U to be less than or equal to the second threshold value Vth12 of the second HEMT 22U (i.e., VGS2≤Vth12).

In the other case, when the forced-off-signal is output, the second drain voltage VD2 of the second HEMT 22U is less than the second source voltage VS2 of the second HEMT 22U (i.e., VD2<VS2). In this case, the forced-off-signal causes the second gate-drain voltage VGD2 of the second HEMT 22U to be less than or equal to the second threshold value Vth12 of the second HEMT 22U (i.e., VGD2≤Vth12). According to the reference example, the second voltage VN2 from the second power source 74 serves as the forced-off-signal. On the basis of the second threshold value Vth12 of the second HEMT 22U and the motor phase voltage VM, the second voltage VN2 is set less than or equal to the value of the following expression: Vth12−|VM| (i.e., VN2≤Vth12−|VM|).

As such, when a short circuit occurs in any of the HEMTs (in this example, the second HEMT 22V), the U-phase lower driver circuit unit 64 keeps the second HEMT 22U from switching to the on state, regardless of whether the motor phase voltage VM is positive or negative. Thus, when a short circuit occurs in any of the HEMTs (in this example, the second HEMT 22V), electric current does not flow between the second drain electrode and the second source electrode of the second HEMT 22U. As a result, electric current does not flow between the three-phase motor 2 and the inverter circuit unit 6.

In conclusion, according to the electric power converter 61, there is no need to interpose motor relays between the three-phase motor 2 and the inverter circuit unit 6. This leads to a reduction in the number of components of the electric power converter 61, thus making it possible to reduce the cost and size of the electric power converter 61. The embodiment and the reference example of the invention may be modified in various ways. Some modifications are described below.

The first CMIS circuit may be a single-chip circuit or a two-chip circuit. That is, the p-type first upper MISFET 45 and the n-type first lower MISFET 46 may be combined in one chip, or may be formed on separate chips. The second CMIS circuit may be a single-chip circuit or a two-chip circuit. That is, the p-type second upper MISFET 55 and the n-type second lower MISFET 56 may be combined in one chip, or may be formed on separate chips.

The electric power converters 1, 16 may be built in a vehicle electric power steering system, as inverter circuits for supplying electric power to a three-phase motor. Other modifications are possible within the scope of the invention.

What is claimed is:

1. An electric power converter comprising:
    an inverter unit configured to convert direct current power, from a direct current source, to alternating current to drive a motor, the inverter unit including a plurality of high electron mobility transistors (HEMTs) that form a plurality of arm circuits;
    a plurality of driver units, each connected to and configured to turn on and off a corresponding one of the plurality of HEMTs;
    a short circuit detector configured to detect a short circuit in the plurality of HEMTs; and
    a controller connected to the plurality of driver units and the short circuit detector, the controller configured to control the plurality of driver units, wherein
    each of the plurality of driver units includes an output unit, an auxiliary power source, a switch unit, and a diode,
    the output unit includes a series circuit of first and second switching elements with drain electrodes connected together,
    the output unit responds to on and off commands from the controller by respectively outputting on and off signals to a gate electrode of the corresponding HEMT from a connection node between the first and second switching elements to turn on and off the corresponding HEMT,
    the auxiliary power source outputs a predetermined positive voltage,
    the switch unit switches between a first connection state where the switch unit connects a source electrode of the first switching element to the auxiliary power source, and a second connection state where the switch unit connects the source electrode of the first switching element to a drain electrode of the corresponding HEMT,
    the diode is interposed between a source electrode of the second switching element and a source electrode of the corresponding HEMT, and is oriented such that forward current through the diode flows from the source electrode of the second switching element to the source electrode of the corresponding HEMT,
    the controller switches the switch unit from the first connection state to the second connection state and outputs the off command to each of the plurality of driver units when determining, on a basis of an output of the short circuit detector, that the short circuit occurs in any of the plurality of HEMTs.

2. The electric power converter according to claim 1, wherein each of the plurality of driver units further includes a first freewheeling diode and a second freewheeling diode, the first freewheeling diode is connected in parallel with the first switching element and is oriented such that forward current through the first freewheeling diode flows from the drain electrode of the first switching element to the source electrode of the first switching element, and the second freewheeling diode is connected in parallel with the second switching element and is oriented such that forward current through the second freewheeling diode flows from the source electrode of the second switching element to the drain electrode of the second switching element.

3. The electric power converter according to claim 1, wherein the auxiliary power source outputs the positive voltage with respect to a source voltage of the corresponding HEMT.

4. The electric power converter according to claim 2, wherein the auxiliary power source outputs the positive voltage with respect to a source voltage of the corresponding HEMT.

\* \* \* \* \*